United States Patent [19]

Zoller

[11] Patent Number: 4,563,141
[45] Date of Patent: Jan. 7, 1986

[54] APPARATUS FOR MAKING AN ELONGATED COMPOSITE ARTICLE

[75] Inventor: Robert A. Zoller, Bay Village, Ohio

[73] Assignee: The Standard Products Company, Cleveland, Ohio

[21] Appl. No.: 590,261

[22] Filed: Mar. 20, 1984

[51] Int. Cl.[4] .............................................. B29C 47/02
[52] U.S. Cl. ................................ 425/114; 264/177 R; 425/461
[58] Field of Search ................ 425/114, 113, 461, 112, 425/190; 156/244; 264/177 F, 45.9, 171, 259, 267, 271.1

[56] References Cited

U.S. PATENT DOCUMENTS

| | | | |
|---|---|---|---|
| 3,136,676 | 6/1964 | Fisch | 156/244 |
| 3,188,256 | 6/1965 | Shoemaker | 156/244 |
| 3,245,864 | 4/1966 | Shanok et al. | 428/128 |
| 3,769,380 | 10/1973 | Wiley | 264/40 |
| 3,843,475 | 10/1974 | Kent | 428/35 |
| 3,881,042 | 4/1975 | Ungerer | 428/67 |
| 3,900,548 | 8/1975 | Wiley | 264/171 |
| 3,956,056 | 5/1976 | Boguslawski et al. | 156/500 |
| 3,959,432 | 5/1976 | Wiley | 264/171 |
| 4,076,570 | 2/1978 | Medley et al. | 156/244 |
| 4,076,790 | 2/1978 | Lind | 264/266 |
| 4,081,504 | 3/1978 | Wenrick et al. | 264/174 |
| 4,087,223 | 5/1978 | Angioletti | 425/114 |
| 4,093,499 | 6/1978 | Naka | 425/114 |
| 4,094,056 | 6/1978 | Takeda et al. | 29/527.2 |
| 4,120,628 | 10/1978 | Simos | 425/131.1 |
| 4,172,745 | 10/1979 | VanManen | 156/84 |
| 4,269,897 | 5/1981 | Gans et al. | 428/419 |
| 4,290,290 | 9/1981 | Wagner et al. | 425/114 |
| 4,516,922 | 5/1985 | Kanotz | 425/113 |

FOREIGN PATENT DOCUMENTS

| | | | |
|---|---|---|---|
| 46-22597 | 6/1971 | Japan | 425/113 |
| 130544 | 1/1951 | U.S.S.R. | 425/113 |

Primary Examiner—Jay H. Woo
Assistant Examiner—J. Fortenberry
Attorney, Agent, or Firm—Harness, Dickey & Pierce

[57] ABSTRACT

An elongated composite article such as an automotive trim strip is made by extruding a thermoplastic material through an extrusion passageway and passing a film strip through a guide passageway in a novel die assembly and then simultaneously passing the thermoplastic material and film strip into a bonding passageway where the thermoplastic material is swelled into bonding engagement with the film strip.

5 Claims, 11 Drawing Figures

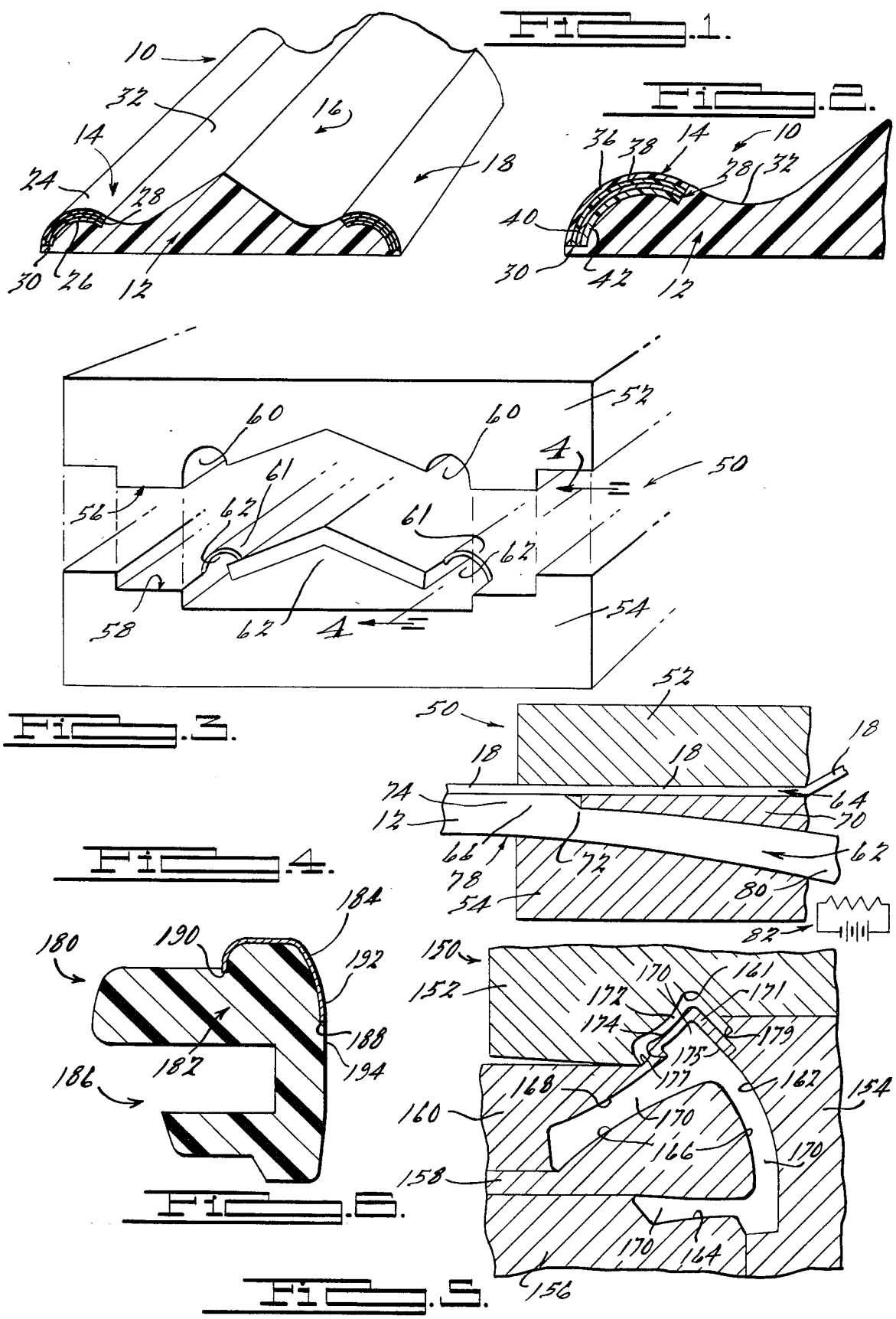

APPARATUS FOR MAKING AN ELONGATED COMPOSITE ARTICLE

BACKGROUND AND SUMMARY OF THE INVENTION

This invention relates generally to elongated composite articles comprising a layer of decorative film on an extruded thermoplastic body and to a method and apparatus for making such articles. More particularly, the present invention relates to decorative trim strips for automotive vehicles and the like and to a method and apparatus for making such trim strips by extruding a thermoplastic body while simultaneously bonding a decorative film strip to at least a portion thereof.

Thermoplastic resin materials can be extruded to form elongated trim strips which can then be used as decorative and/or protective trim for automotive vehicles, appliances and other structures. Trim strips can be attached to exterior or interior surfaces by adhesives or other conventional fastening means and are especially well adapted for use on automotive vehicles, for example, as automotive vehicle side moldings to protect automotive bodies from door strikes while improving the appearance of the vehicle. The appearance of the trim strip itself is often of considerable importance and trim strips of various colors and shapes are known as is the use of a film strip such as a metallic or metallized film strip on at least a portion of the trim strip to present a metallic appearance and to further enhance the aesthetic appeal of the trim strip.

In the manufacture of decorative trim strips with metallized film, the metallized film has generally been laminated to an extruded thermoplastic body by first extruding the thermoplastic body, then securing the metallized film onto a surface portion of the body and then covering the entire outer surface of the film strip and the adjacent areas of base material with a transparent top coat or cover composed of transparent polyvinyl chloride or other transparent thermoplastic material. A top coat or cover over the metallized film is generally necessary to protect the metallized film from the environment. Metallized film usually comprises a thin plastic film sheet such as a polyethylene terephthalate film sheet and an extremely thin layer of metal, such as aluminum, vapor deposited on one or both sides of the film sheet. The initial bright appearance of the metal quickly disappears if it is exposed to weather or corrosive materials. Furthermore, in use, the metal layer can generally be scraped off if it is left exposed and unprotected.

It is not only generally necessary to protect both surfaces of the metallized film, it is also necessary to protect the edges of the film from the environment. Thus, it has generally been the practice to provide a protective top coat over not only the metallized film itself but also the adjacent areas of base material in order to ensure that the edges of metallized film are protected. Unfortunately, this construction is difficult to manufacture, relatively expensive, and results in an undesirably shiny portion of base material, i.e., the areas of base material adjacent to the metallized film coated with transparent top coat. Thus, there is a need for an inexpensive and practical means for providing a trim strip having a metallized film thereon with protected edges obtained other than by top coating adjacent base material.

In accordance with the present invention, a method and apparatus are provided for making an elongated composite article, such as an automotive trim strip or the like, having an extruded thermoplastic body and at least one film strip bonded to a portion of the body. In accordance with the method of the present invention, a thermoplastic body is extruded generally to its desired cross-sectional shape through a longitudinally-extending extrusion passageway in a die assembly. A decorative film strip is simultaneously passed through a guide passageway in the novel die assembly. The decorative film strip is preferably a metallized film which has been topcoated with a protective transparent layer. The guide passageway and the extrusion passageway are separate and isolated from each other but both are in downstream fluid communication with a bonding passageway. Thus, the body and the film strip are passed into the bonding passageway wherein the film strip is bonded to the desired portions of the body. In the bonding passageway, the body expands or swells into contact with the film strip as is bonded thereto, preferably by heat. The bonding passageway preferably has an inlet with a lateral cross-sectional area greater than the combined lateral cross-sectional areas of the extrusion and guide passageways. The bonding passageway also has an outlet which preferably is slightly constricted in cross-sectional area relative to the inlet to facilitate contact between the film strip and body forcibly urging the film strip and body together to increase the bond therebetween. Depending upon the exact structure of the novel die assembly of this invention, the body can expand or swell into bonding engagement with the lateral edges as well as the bottom or inner surface of the trim strip in order to produce a smooth, substantially uninterrupted outer surface or an inlaid effect. Alternately, the base material can expand over lateral edge portions of the top or outer surface of the film strip.

The method and apparatus of the present invention offer many advantages. The present invention facilitates extrusion of hollow or irregular shaped bodies with a metallized film strip on a portion of an outer surface thereof. In accordance with this invention, the edges of a metallized film strip are well sealed against the environment, even where the metallized film strip is flush with the adjacent trim strip surface to provide an inlaid effect. The invention also offers advantages with regard to minimizing tooling components and apparatus required for production of the elongated extrusions and, hence, offers reduced set-up time, start-up time, and down time during production. Additional advantages and features of the present invention will become apparent from the following description and the appended claims taken in conjunction with the accompanying drawings.

BRIEF DESCRIPTION OF THE DRAWINGS

FIG. 1 is a perspective view, partially in lateral cross-section and broken away, of a trim strip constructed in accordance with the present invention.

FIG. 2 is an enlarged lateral cross-sectional view, broken away, of a portion of the trim strip of FIG. 1.

FIG. 3 is a perspective view, broken away, of a die assembly for making the trim strip shown in FIG. 1.

FIG. 4 is a longitudinal cross-sectional view of the die assembly of FIG. 3, broken away and taken along line 4—4 of FIG. 3.

FIG. 5 is an intermediate lateral cross-sectional view, broken away, of an alternate die assembly for making a trim strip according to the present invention, but having a lateral cross-section different from that of the trim strip shown in FIG. 1.

FIG. 6 is a lateral cross-sectional view of a trim strip made with the die assembly of FIG. 5.

DETAILED DESCRIPTION OF THE PREFERRED EMBODIMENTS

Figure 7:
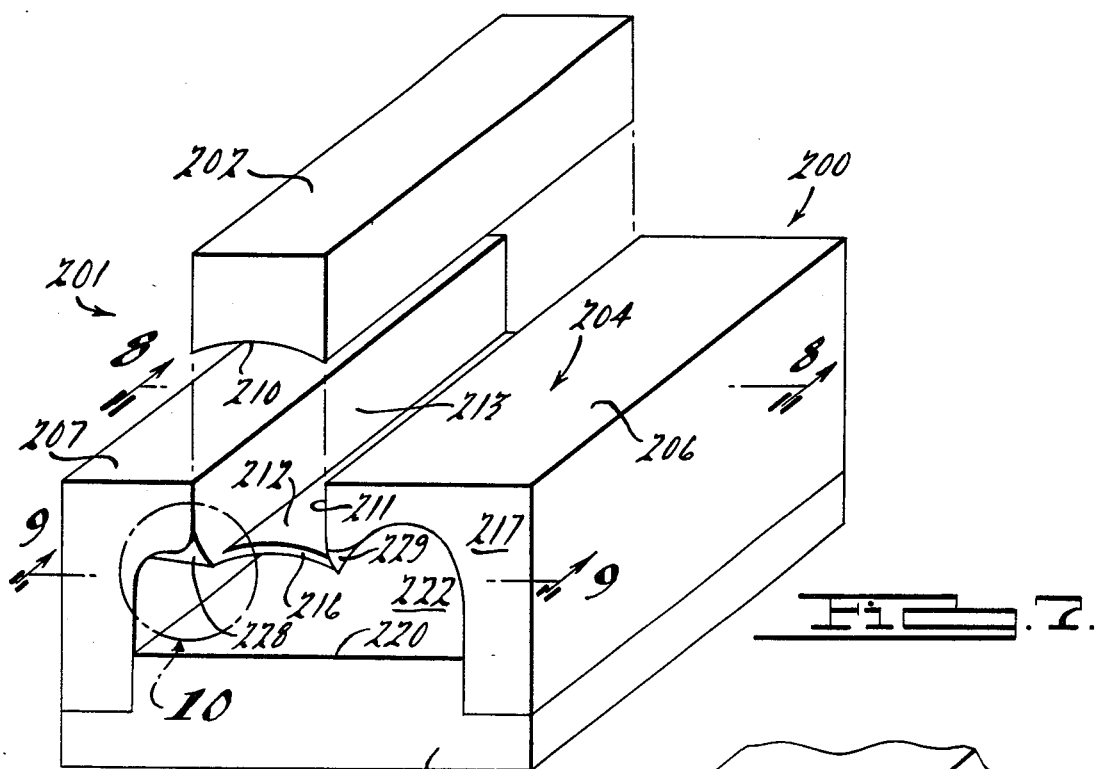
FIG. 7 is a perspective view of another alternate die assembly of the present invention.
Figure 10:
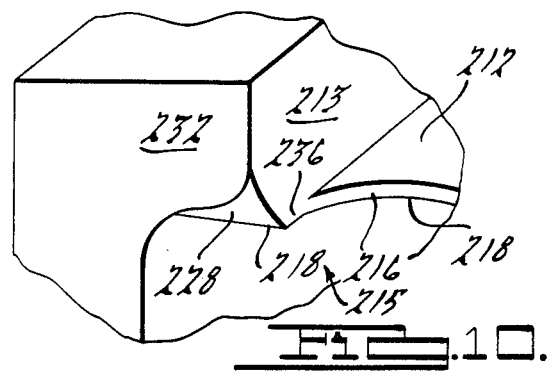
FIG. 10 is an enlarged perspective view of the portion of the die assembly of FIG. 7 shown in circle 10 in FIG. 7.
Figure 8:
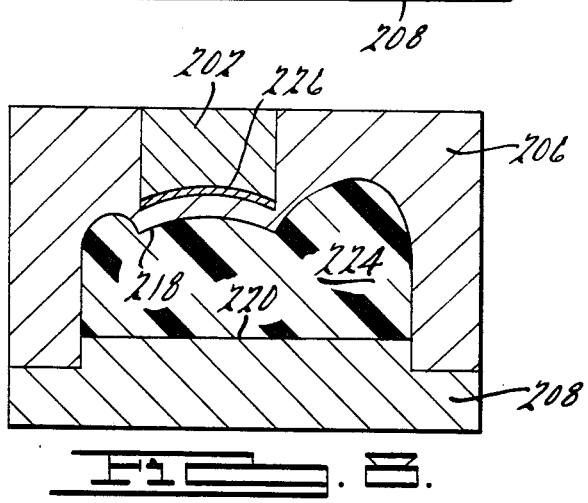
FIG. 8 is a lateral cross-sectional view of the alternate die assembly of FIG. 7, taken along line 8-8 of FIG. 7 and with decorative film and thermoplastic body material added in the die assembly.
Figure 9:
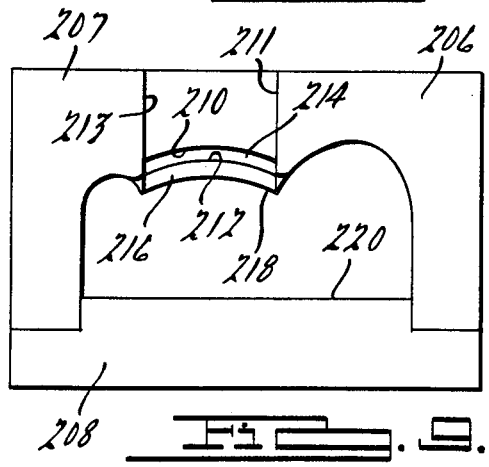
FIG. 9 is an end view of the alternate die assembly of FIG. 7 taken in the direction shown by 9—9 of FIG. 7.

Now referring to the figures, FIGS. 1 and 2 illustrate an elongated automotive trim strip 10, which generally includes body 12 having decorative films 14 and 18 bonded to portions thereof. Body 12 is composed of a thermoplastic material such as polyvinyl chloride which can be heated and extruded to a predetermined desired cross-section. Decorative films 14 and 18 preferably include metallized film strips such as aluminized polyester which presents a brilliant metal-like appearance.

Decorative films 14 and 18 are of like construction with the following description of film 14 being equally applicable to film 18. Film 14 has an outwardly facing surface 24, an inwardly facing surface 26 oriented toward body 12, and lateral edges 28 and 30. Preferably, and as shown in FIGS. 1 and 2, decorative film 14 is a laminate including a metallized film. Thus, decorative film 14 includes a transparent outer layer 36, an intermediate film layer 38, metal layer 40, and an inner layer 42. Intermediate film layer 38 can be, for example, transparent polyethylene terephthalate film having an aluminum metal layer 40 vapor deposited thereon in a conventional manner. Outer layer 36 is top coated onto layer 38 for protective purposes and can be comprised of, for example, transparent polyvinyl chloride. Inner layer 42 can be composed of polyvinyl chloride or other thermoplastic material which can be readily bondable to thermoplastic body 12 by way of the application of heat. It should be noted that the above-mentioned materials are exemplary only, one skilled in the art will readily recognize that other suitable materials may be employed herein.

Both the inner surface 26 and the lateral edges 28 and 30 of decorative film 14 are bonded to contiguous portions of body 12, and the decorative film strip 14 is inlaid such that the outwardly facing surface 24 of film 14 is substantially flush with adjacent portion of outwardly facing surface 32 of body 12 to thereby present a substantially continuous outer surface for the finished trim strip 10 itself.

Trim strip 10 can be made by employing a novel extrusion die assembly and method of the present invention, as illustrated in FIGS. 3 and 4. Die assembly 50 generally includes a upper die block 52 having an upper die surface 56 and a lower die block 54 having a lower die surface 58. The upper and lower die surfaces 56 and 58 are generally in facing relationship and include portions in spaced, facing relationship and portions in contacting facing relationship. Upper die block 52 has low friction recessed portions 60 and lower die block 54 has corresponding protruding portions 61. Recessed portions 60 and protruding portions 61 define longitudinally extending guide passageways 64 when upper and lower die blocks 52 and 54 are engaged. Guide passageways 64 allow transportation of decorative films 14 and 18 and are required to form trim strip 10 in accordance with the present invention. The location of guide passageways 64 corresponds with the location of predetermined portions of body 12 to which decorative film strips 14 and 18 are to be bonded.

Lower die block 54 of die assembly 50, has a longitudinally-extending extrusion passageway 62 adapted for extruding thermoplastic material 80 to form body 12 of trim strip 10. As will be appreciated by those skilled in the art, the lateral cross-sectional shape of extrusion pasageway 62 can be shaped to obtain the desired lateral cross-section of body 12 of the trim strip 10 and can be varied to obtain various desired cross-sectional shapes.

Extrusion passageway 62 and guide passageways 64, mentioned above, are separated and isolated from each other by a barrier 70 but terminate downstream where each is in fluid communication with a bonding passageway 66. Bonding passageway 66 includes an inlet 72 and an outlet 74, with the lateral cross-sectional area of the inlet 72 preferably being greater than the combined lateral cross-sectional areas of the extrusion passageway 62 and the guide passageway 64. Preferably, outlet 74 has a lateral cross-sectional area smaller than that of inlet 72 for a purpose which is explained in detail below.

It should be noted that although the die assembly 50 is illustrated in FIGS. 3 and 4 as having only a pair of die blocks 52 and 54, any number of separable but mutually engageable die blocks may be provided for purposes of ease of machining the die surfaces and recesses when the die blocks are made, ease of cleaning or other maintenance of the die blocks, and convenient assembly and operation.

In accordance with the method of the present invention, die assembly 50 can be used to make trim strip 10. Decorative film strips 14 and 18 are preferably prelaminated and cut to appreciate widths in accordance with conventional lamination and forming techniques and are each placed within the appropriate passageway 64. Body material 80 which has been heated by means of a conventional heat source, such as that illustrated schematically at 82, is forcibly urged into extrusion passageway 62 and extruded therethrough. Simultaneously with extrusion of body material 80, film strips 14 and 18 are passed through guide passageways 64, which are located with respect to passageway 62 in a position corresponding to the desired location of the film strips 14 and 18 on the finished trim strip 10.

Decorative film strips 14 and 18 are bonded to the extruded body material 80 in bonding passageway 66 wherein body material 80 expands or swells into a bonding engagement or contact with thermoplastic inner layer 42 of decorative film strips 14 and 18 which are thus bonded to body 12 by heat. It is preferred that outlet 74 of bonding passageway 66 have a lateral cross-sectional area slightly smaller than that of inlet 72, to insure that body material 80 and decorative film strip 18 are forcibly urged into bonding engagement or contact along their respective contiguous surfaces in order to assure bonding therebetween. It will be appreciated that although it is generally preferable to obtain bonding between all contiguous surfaces of decorative film and body material, by, for example, selecting an inner layer having a medial portion which is not heat bondable to the body material, the decorative film may be bonded to the body only along the lateral edge of the film in order to provide an unbonded medial area of the film. With the bonding of decorative film strip to body material being completed, the finished trim strip 10 is continuously expelled from the outlet 78 of the die assembly 50, the extrusion of body material 80 serving to pull decorative film strip 18 through the die assembly.

It should be noted that the configuration of die assembly 50, discussed above and shown in FIGS. 3 and 4, is intended to illustrate a die assembly for making an exemplary trim strip 10. The trim strip and the corresponding die assembly may have other desired shapes, sizes or configurations, another example of which is shown, for purposes of illustration only, in FIG. 5.

FIG. 5 is a lateral cross-sectional view of an alternate die assembly 150 taken through an intermediate portion thereof. Die assembly 150 generally includes die blocks 152, 154, 156, 158, 160 and barrier 171. An extrusion passageway 170 is defined by surfaces 162, 164, 166, 168 and 175 of die blocks 154, 156, 158, 160 and barrier 171, respectively. Surfaces 161 and 179 have low friction such as can be provided by teflon coating or inserts. A guide passageway 172 is defined by surfaces 161, 179, 174 and 177 of die blocks 152 and 154, barrier 171 and die block 160, respectively. Such extrusion and guide passageways 170 and 172, which correspond in their function to the extrusion and guide passageways 62 and 64 of the die assembly 50 discussed above, are isolated and separated by barrier 171 but are in downstream fluid communication with a bonding passageway analogous to bonding passageway 66 of die assembly 50. The die assembly 150, illustrates a die assembly having a multiplicity of separable but mutually engageable die blocks and further illustrates that a die apparatus and associated method, according to the present invention, may be employed to make trim strips having a variety of desired shapes and configurations. In particular, die assembly 150 facilitates extrusion of a trim strip with a decorative film bonded to a body having a cavity 186 as shown in FIG. 6.

Thus, the die assembly of FIG. 5 can be used to make a trim strip as shown in FIG. 6 which illustrates an alternative trim strip of the present invention indicated generally by the numeral 180. Trim strip 180 has a body 182 comprised of extruded thermoplastic material such as polyvinyl chloride and a decorative film 184 which is bonded to a portion of body 182. Decorative film 184 is preferably of a laminate construction analogous or identical to that of decorative film 10, however, for purposes of simplifying the view shown in FIG. 6, decorative film 184 is represented as only one layer. Body 182 is characterized in having a large cavity or channel 186 which underlies a portion of body 182 carrying decorative film 184. It will be appreciated by those skilled in the art that bonding decorative film 184 to body 182 having cavity 186 would be difficult using conventional methods but is facilitated using the die apparatus and method of the present invention wherein body 182 has been extruded through extrusion passageway 170 and decorative film 184 has been passed through guide passageway 172 of die assembly 150. It will also be appreciated that the lateral edges 188 and 190 of decorative film 184 are sealed by contiguous portion of body 182 and that one lateal edge portion of outwardly facing surface 192 of decorative film 184 is flush with the adjacent surface 194 of body 182.

Now referring to FIGS. 7–11, still another alternative die assembly, method and trim strip of the present invention are illustrated. In accordance with this alternative, a trim strip is provided with a decorative film having lateral side edges embedded into a portion of the body thereof. The lateral side edges are thus well sealed and protected against the weather elements.

FIGS. 7–10 illustrate a die assembly, indicated generally by the numeral 200, having an upper die block 201 subassembly and a lower die block 208. Upper die block 201 subassembly has a separable center die block 202 and intermediate die block section 204 having side die block portions 206 and 207 connected by bridge portion 216. Center die block 202 has a low friction surface 210 facing surface 212 of bridge 216 which surfaces, in conjunction with surface 211 of side die block portion 206 and surface 213 of side die block portion 207, define longitudinally extending guide passageway 214 adapted to pass through a decorative film or the like.

Upwardly facing surface 220 of lower die block 208 and surface 218 of intermediate die block section 204 define longitudinally extending extrusion passageway 222. Extrusion passageway 222 and guide passageway 214 communicate with a bonding passageway 215 at the forward-end of bridge 216 where thermoplastic body material being extruded through extrusion passageway 222 is allowed to expand upwardly to contact and come into bonding engagement with decorative film being passed through guide passageway 214.

Figure 11:
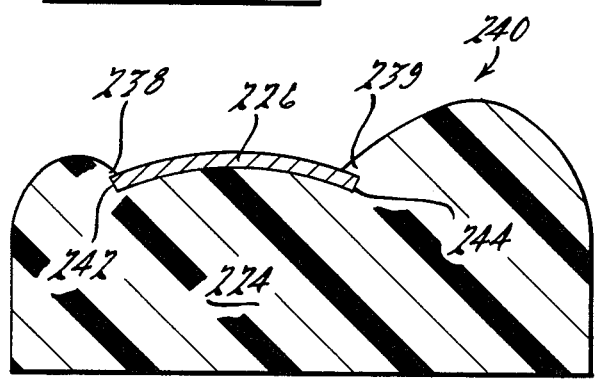
FIG. 11 is a lateral cross-sectional view of a trim strip made using the die assembly of FIGS. 7-10.

Bonding passageway 215 is characterized by shoulders 228 and 229 where surfaces 213, 218 and 232 of side die block portion 207 and surfaces 211, 217 and 218 of side die block portion 206 respectively come together. Shoulders 228 and 229 provide cavities into which extruded body material can expand to extend over adjacent top lateral surfaces of decorative film to provide a trim strip as shown in FIG. 11. Shoulder 228 is downstream of bridge 216. Thus, at the upstream portion of bonding passageway 215, side wall portion 236 and an analogous side wall portion of side wall 211 define a width equal to that of decorative film passing through bonding passageway 215. Thus, body material is allowed to expand upwardly into bonding engagement only with the surface of decorative film in facing relationship therewith not with the lateral edges or top surface portion of the decorative film. However, downstream of surface 236, shoulders 228 and 229 allow expansion of body material around the lateral edges of decorative film and over the top lateral edge surface portions thereof.

Thus, a trim strip as shown in FIG. 11 and illustrated generally by the numeral 240 can be provided. Trim strip 240 has extruded body 224 with decorative film 226 bonded thereto. Body 224 is made of thermoplastic material such as polyvinyl chloride and film 226 is preferably of a laminate construction the same as decorative film 14 or 18 of trim strip 10. Body 224 has portions 238 and 239 extending over lateral edges of decorative film 226 which insures that lateral edges 242 and 244 are well sealed against the weather elements.

The foregoing discussion discloses and describes exemplary embodiments of the present invention. One skilled in the art will readily recognize that the principles of the invention are broadly applicable to other elongated composite articles and associated methods and apparatus for making such articles, as well as to trim strips and associated methods and apparatus other than those shown in the drawings. It is thus intended that various changes, modifications and variations may be made to the embodiments described herein without departing from the spirit and scope of the invention which is intended to be limited only as defined in the following claims.

What is claimed is:

1. A device for extruding an elongated thermoplastic article, said article having a body with at least one film strip bonded to at least a predetermined portion thereof, said device comprising:

a die assembly;

an extrusion passageway extending in a generally longitudinal direction in said die assembly, said extrusion passageway being adapted for extruding a thermoplastic material therethrough;

a guide passageway extending in a generally longitudinal direction in said die assembly and being adapted for passing a film strip therethrough, said guide passageway being separate and isolated from said extrusion passageway; and a bonding passageway downstream of said extrusion and guide passageways and extending in a generally longitudinal direction in said die assembly and having a predetermined lateral cross-section configuration shaped to obtain the desired lateral cross-section of said elongated article, said bonding passageway being enlarged relative to said extrusion and guide passageways and further being adapted to allow said thermoplastic material from said extrusion passageway to swell into contact with said film strip in said bonding passageway in order to bond said film strip to said predetermined portion of said elongated thermoplastic article.

2. A device according to claim 1, wherein said bonding passageway includes an inlet and an outlet, said inlet communicating with said extrusion and guide passageways and having a lateral cross-sectional area greater than the combined lateral cross-sectional areas of said extrusion and a guide passageway, the lateral cross-sectional area of said outlet being less than that of said inlet, and said bonding passageway being adapted to forcibly urge said thermoplastic material into said contact with said film strip during said bonding thereof.

3. A device according to claim 2, wherein said die assembly includes at least a pair of die blocks, said die blocks being mutually engageable and each having at least one recess thereof adapted to define said guide passageway therebetween when said die blocks are in such mutual engagement, said die blocks further being separable to allow said film strip to be placed within one of said recesses prior to said die blocks being mutually engaged.

4. A device according to claim 2, wherein said die assembly includes a number of distinct die blocks, said die blocks having surfaces thereon that are adapted to define said extrusion, guide and bonding passages when said die blocks are assembled into said die assembly.

5. A device according to claim 1, wherein said die assembly further includes a longitudinally-extending barrier isolatingly separating said extrusion passageway from said guide passageway, said barrier being generally coextensive with said extrusion and guide passageways and terminating at said bonding passageway.

* * * * *